S. C. TALCOTT.

MEASURING PACKAGED FABRICS.

No. 7,064. Reissued April 18, 1876.

*Witnesses*

*W. B. Masson*

*W. H. B. Lelon*

*Inventor:*

*Samuel C. Talcott*

*By E. E. Masson*
*atty*

UNITED STATES PATENT OFFICE.

SAMUEL C. TALCOTT, OF ASHTABULA, OHIO.

IMPROVEMENT IN MEASURING PACKAGED FABRICS.

Specification forming part of Letters Patent No. 165,131, dated June 29, 1875; reissue No. 6,829, dated December 28, 1875; reissue No. 7,064, dated April 18, 1876; application filed April 5, 1876.

*To all whom it may concern:*

Be it known that I, SAMUEL C. TALCOTT, of the city and county of Ashtabula and State of Ohio, have invented a new and useful Method of Ascertaining and Registering the Linear Measure of Packaged Fabrics; and that the following is a description thereof, reference being had to the accompanying drawing, in which—

Figure 1:
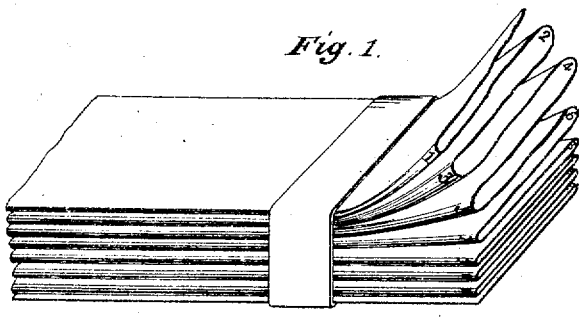
Figure 2:
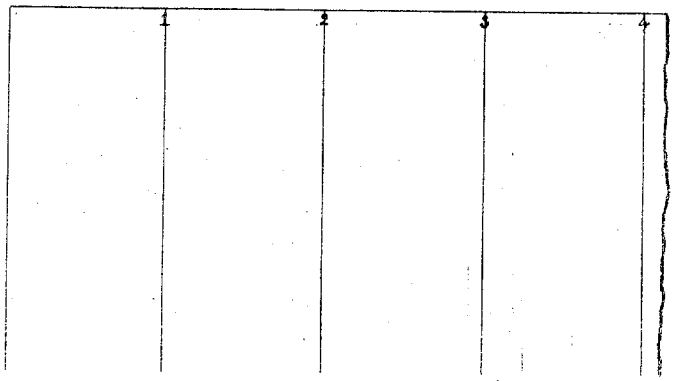

Figure 1 represents, in perspective, a package of folded cloth, with a portion of its folds partially opened and turned up, to exhibit more clearly the graduation and notation by which its linear measure is shown; the symbols of notation, in this instance, being placed symmetrically on the positions for the graduation-marks of the units of measure, to indicate, by their position, the graduation of the units, while denoting by their character, the number of the units; and Fig. 2 represents in plan the back of a piece of graduated cloth, unfolded and spread out, to show its graduation into units of equal length, by lines, in this example, running across the web, to indicate also the places for the folding or for the severance of the piece parallel to its ends.

The numerals at the edge of the web, on the graduation-lines, indicate the units of the graduation.

The principal object of my invention is to dispense with the use of accessory measuring instruments in ascertaining the linear dimensions of that class of fabrics which are manufactured in webs, and wound, rolled, or folded in packaging them for storage or sale; and I accomplish this object by so preparing and putting up the fabric that, after the package is complete, there will always be marks or symbols on the outer end of the goods to indicate its linear dimensions, *i. e.*, its measure, whether the package remains unbroken or it has been opened and a remnant only remains; and my invention consists in measuring and graduating the fabric into units of equal length, (and subdividing these units when expedient,) numbering consecutively such units by suitable symbols of notation, and winding the cloth into a roll, or bolt, or disposing it in folds; such measurement, graduation, and notation to begin at one end of the goods, (herein called the initial end,) which is to be placed at the inner part of a roll or coiled package, and to be regularly continued to the opposite end (herein called the terminal end) of the goods, which is at the outside of the package, and the first to be cut off for use or sale.

The graduation and notation marks may be made by imprinting, stamping, chalking, penciling, or otherwise, as may be most suitable or convenient, upon the fabric, and so that the terminal notation and graduation will always be a true register of the linear quantity of goods in the package or remnant, while the graduation and notation on any portion of the goods severed from the package will, by mere inspection and counting or computation, and without resort to comparison with an accessory measure, show the length of such severed portion.

The unit of measure shown by the graduation-lines and numerals in the accompanying drawing is a yard, on a reduced scale. The package represented in perspective by Fig. 1 is a rectangular prism, formed by arranging the goods in superposed folds, each a yard long, and binding the folds so arranged with a band in the usual manner, the initial fold, graduation, and notation being, as the package lies, at its upper side and the terminal fold at the bottom.

If the goods were packaged by winding the cloth in a scroll to form a roll, or around a board to form a bolt, instead of being folded into a package of the form of a four-sided prism, as shown in Fig. 1, the initial graduation and notation and inner end of the web would be at the middle of the roll or axis of the scroll, coil, or bolt, and the terminal graduation and notation and the outer end of the piece would be at the surface of the roll.

The extension of the graduation-lines of the unit of measure across the web, as shown in Fig. 2, not only indicates the position of the folds necessary to make an even and symmetrical rectangular package, but also serve as a guide for the severance of the piece at right angles to its length, thus avoiding the cutting of skew or biased ends, which, although so wasteful, could hardly be avoided heretofore in cutting plain cloth, in which the line of the weft-thread could not readily be seen.

Pieces of goods may be measured by laying them flat upon a bench equal in length to the longest web, the front edge of the bench, which should be straight, having a scale of equal yard-units and subdivisions thereof, graduated upon it, the units being numbered consecutively from one end of the bench to the other, the end at which the notation begins being termed the initial and the other the terminal end. One end of the web must be placed even with the initial end of the bench, and one side of the web even with the graduated scale on the side of the bench.

Graduation and notation marks must now be made with paint, ink, or otherwise, upon the edge of the cloth, to correspond with those upon the bench; the graduation and notation marks at the terminal end of the web will be a true record of its full measure or length, the intermediate graduation and notation will indicate the measure of parts of the web. This is the simplest way of measuring, graduating, and notating the fabric, but I deem it preferable that the graduation and notation marks should be printed upon the goods by modifying the machines in use for measuring the length of a web of cloth so as to make them subdivide it into uniform units, and combining with the measuring apparatus a series of suitable types, fitted with inking apparatus, for imprinting upon the goods characters or symbols to denote the units and the notation simultaneously with the admeasurement, and where great precision in the divisions is not required the notation figures may be placed centrally upon the positions of the units of measure to make the same symbols serve both as graduation and notation marks. As such measuring and printing mechanism are not herein claimed, a particular description thereof in this specification would be superfluous. The ink or pigment employed for marking the graduation and notation and making the folding or cutting lines may either be paints or fast colors, French chalk that would brush out, or colored starch, paste, or mucilage readily soluble in water, so that the marks would disappear upon the fabric being brushed or washed. The ink or pigment should be selected which, in each case, is deemed best suited to the wants of those who buy the cloth.

It is obvious that suitable characters or symbols of the graduation and of the notation might be made in many different ways, and attached to the fabric by various means well known in the arts, so as to produce the accurate self-measurement and graduation of the cloth and the self-registry of its own length in a package or remnant which my invention contemplates.

When a portion of the goods is to be severed from the package it must always be taken from that end of the fabric at which the graduation and notation terminate, for, then, the quantity left in the remnant will be correctly registered by the terminal notation and graduation thereon.

In graduating coarse and cheap goods it might not be advisable to subdivide the units of measure, whether meters, yards, or feet, as the fraction of a unit of measure of such goods could be estimated with sufficient nearness by the eye; but for fine or costly goods it would be expedient to subdivide the units into halves, quarters, eighths, and in some cases down to much smaller parts. This would easily be done by providing appropriate supplemental types in the measuring and printing machinery, or suitable symbols stamped or otherwise made, and attached by any suitable means.

My automatically-measured and graduated and notated goods, not only saves the labor, but also avoids the mistakes and the not uncommon fraud of manual measuring; and the self-registry of the quantity in every package, whether broken or unbroken, among other advantages, greatly facilitates the making out of inventories, by saving the time and labor involved in unrolling, measuring, and re-rolling cut packages, and uncut ones which have lost their measure tags or marks.

Attempts have been made to attain some of these results by folding or winding up graduated and notated paper measures with the fabric, but this plan has failed, from the fact, among others, that the measure and fabric were coiled in separate and independent spirals, which, although starting from a common point, have, after leaving it, no common point of meeting for their equal units of length. On the contrary, the terminals of those units progressively recede from each other as the roll increases, because the fabric and measure wind round the axis in their respective paths with unequal linear progression.

The defects of the measuring-strip method are all avoided by my method of dispensing with this and all other accessory measures, by making the packaged fabric itself a graduated and notated measure of its own length and its own register of the units of linear measure which, from time to time, it contains.

What I claim is—

1. The preparation of fabrics for sale and inventory, by measuring, graduation, notation, and packaging, substantially as described.

2. In combination with the graduation and notation, transverse guide-lines to facilitate the folding or severance of the fabric without bias, substantially as described.

SAMUEL C. TALCOTT.

Witnesses:
JOHN M. HARRINGTON,
C. T. BRUEN.